US009867492B2

(12) United States Patent
Deng et al.

(10) Patent No.: US 9,867,492 B2
(45) Date of Patent: Jan. 16, 2018

(54) WATER DISPENSER HAVING BEVERAGE-MAKING FUNCTION

(71) Applicants: MIDEA GROUP CO., LTD., Beijiao (CN); GUANGDONG MIDEA WATER DISPENSER MFG. CO., LTD., Beijiao (CN)

(72) Inventors: Bingfeng Deng, Beijiao (CN); Yong Gao, Beijiao (CN); Long Ma, Beijiao (CN)

(73) Assignees: MIDEA GROUP CO., LTD., Foshan (CN); GUANGDONG MIDEA WATER DISPENSER MFG. CO., LTD., Foshan (CN)

(*) Notice: Subject to any disclaimer, the term of this patent is extended or adjusted under 35 U.S.C. 154(b) by 1032 days.

(21) Appl. No.: 14/136,249

(22) Filed: Dec. 20, 2013

(65) Prior Publication Data

US 2015/0075388 A1    Mar. 19, 2015

(30) Foreign Application Priority Data

Sep. 16, 2013  (CN) .......................... 2013 1 0423084

(51) Int. Cl.
*A47J 31/40*   (2006.01)
*B67D 3/00*    (2006.01)
*B67D 1/00*    (2006.01)
*B67D 1/08*    (2006.01)

(52) U.S. Cl.
CPC .......... *A47J 31/407* (2013.01); *B67D 1/0078* (2013.01); *B67D 1/0861* (2013.01); *B67D 3/0009* (2013.01); *B67D 3/0019* (2013.01); *B67D 3/0038* (2013.01); *B67D 2001/0812* (2013.01)

(58) Field of Classification Search
CPC ... A47J 31/407; B67D 1/0078; B67D 1/0861; B67D 3/0009; B67D 3/0019; B67D 3/0038
USPC .......................................... 99/295, 290, 300
See application file for complete search history.

(56) References Cited

U.S. PATENT DOCUMENTS

| 5,325,765 A * | 7/1994 | Sylvan ................ A47J 31/0673 426/433 |
| 2008/0245236 A1* | 10/2008 | Ternite ................ A47J 31/0668 99/295 |
| 2010/0028495 A1* | 2/2010 | Novak ................ A47J 31/0668 426/77 |
| 2013/0004629 A1* | 1/2013 | Clark .................. A47J 31/4467 426/231 |

FOREIGN PATENT DOCUMENTS

| CN | 1781420 | 6/2006 |
| CN | 2820020 | 9/2006 |

(Continued)

*Primary Examiner* — Omar Flores Sanchez
(74) *Attorney, Agent, or Firm* — Hodgson Russ LLP

(57) ABSTRACT

A water dispenser having beverage-making function is provided. The water dispenser can include a body defining a beverage making cavity with an open side therein; a beverage making assembly disposed in the beverage making cavity and including a beverage container for accommodating a beverage capsule, the beverage container having a first penetration member for penetrating a bottom of the beverage capsule; and a water injection mechanism for supplying water to the beverage capsule and having a second penetration member for penetrating a top of the beverage capsule.

22 Claims, 11 Drawing Sheets

(56) References Cited

FOREIGN PATENT DOCUMENTS

| | | |
|---|---|---|
| CN | 201019539 | 2/2008 |
| CN | 201727359 | 2/2011 |
| CN | 102028411 | 4/2011 |
| CN | 201822642 | 5/2011 |
| CN | 102188161 | 9/2011 |
| CN | 103110353 | 5/2013 |
| CN | 203555590 | 4/2014 |
| EP | 0592943 | 4/1994 |

* cited by examiner

WATER DISPENSER HAVING BEVERAGE-MAKING FUNCTION

CROSS-REFERENCE TO RELATED APPLICATION

This application claims priority to and benefits of Chinese Patent Application Serial No. 201310423084.5, filed with the State Intellectual Property Office of P. R. China on Sep. 16, 2013, the entire content of which is incorporated herein by reference.

FIELD

The present invention relates to a household appliance, and more particularly relates to a water dispenser having beverage-making function.

BACKGROUND

The water dispenser and the beverage making machine are widely used, which are generally separated from and independent of each other. Even if the water dispenser is connected with the beverage making machine in some case, the beverage making machine is just simply disposed on a top of the water dispenser, and the water dispenser only provides water and power for the beverage making machine, so that it is not convenient to use and a large space is needed by the water dispenser and the beverage making machine.

SUMMARY

Embodiments of the present invention provide a water dispenser having beverage-making function. The water dispenser having beverage-making function comprises: a body defining a beverage making cavity with an open side therein; a beverage making assembly disposed in the beverage making cavity and including a beverage container for accommodating a beverage capsule, the beverage container having a first penetration member for penetrating a bottom of the beverage capsule; and a water injection mechanism for supplying water to the beverage capsule and having a second penetration member for penetrating a top of the beverage capsule.

With the water dispenser according to embodiments of the present invention, by disposing the beverage making assembly including the beverage container into the beverage making cavity defined in the body of the water dispenser, the beverage making assembly is incorporated into the water dispenser. Thus, the water dispenser can provide both water and beverage, occupies a small space and is convenient to use.

In some embodiments, the first penetration member is a tubular member being hollow and having a first radial through hole and a sharp upper end; and the second penetration member is a tubular member being hollow and having a second radial through hole and a sharp lower end.

In some embodiments, the beverage making assembly is detachably disposed in the beverage making cavity.

In some embodiments, the beverage making assembly further comprises: a gripping part for supporting the beverage container adapted to connect with an inner wall of the beverage making cavity via a snap structure.

Alternatively, the gripping part comprises: an annular supporting member for supporting the beverage container connected to the inner wall of the beverage making cavity; and a handle connected with a side of the annular supporting member remote from the beverage making cavity.

In some embodiments, the snap structure comprises a plurality of snap tongues disposed on the gripping part and bent in the same direction, and a plurality of snap holes formed in the inner wall of the beverage making cavity and corresponding to the snap tongues respectively, and the gripping part and the inner wall of the beverage making cavity are detectably connected by extending the plurality of snap tongues into the plurality of snap holes and then rotating the gripping part. Thus, the beverage making assembly can be mounted steadily and detached conveniently.

Advantageously, a micro switch is disposed on an outer wall of the beverage making cavity, and the micro switch is actuated by extending the snap tongue into the snap hole and then rotating the gripping part so as to turn on a circuit in the body for making beverage.

In some embodiments, the gripping part has a movable pressing member, a first end of the pressing member is abutted against the inner wall of the beverage making cavity, and the pressing member is configured such that the first end thereof is disengaged from the inner wall of the beverage making cavity when actuated.

Alternatively, the handle comprises: a connecting handle portion connected with the annular supporting member and having a through hole penetrating therethrough; and a gripping handle portion connected with the connecting handle portion. The pressing member comprises a button and an actuating rod, the button is movable in the through hole, a first end of the actuating rod is connected with the button, and a second end of the actuating rod is abutted against the inner wall of the beverage making cavity.

Alternatively, the connecting handle portion is substantially horizontally disposed, the gripping handle portion is provided with a supporting handle portion substantially parallel to the connecting handle portion, and the pressing member is disposed on the supporting handle portion via a first spring.

In some embodiments, the beverage making assembly further comprises: a baffle plate disposed between the handle and the beverage container and configured to close the open side after the beverage making assembly is assembled in the beverage making cavity. Thus, the beverage container is shielded, thus improving the aesthetics of an appearance of the water dispenser having beverage-making function.

In some embodiments, the water injection mechanism further comprises: a driving rod connected pivotably to a top of the beverage making cavity and configured such that two ends thereof are rotatable, in which the second penetration member is disposed vertically on a first end of the driving rod, and when the beverage making assembly is put into the beverage making cavity, the gripping part drives a second end of the driving rod to rotate so as to drive the second penetration member to penetrate the top of the beverage capsule; and a second spring disposed between the second end of the driving rod and the inner wall of the beverage making cavity.

In some embodiments, the water injection mechanism further comprises a sealing member located below the first end of the driving rod, fitted over the second penetration member and compressed onto the top of the beverage capsule. Thus, the second penetration member can penetrate the top of the beverage capsule easily, such that it is convenient to supply water to the beverage capsule.

In some embodiments, the water injection mechanism further comprises a water pipe communicated with the second penetration member to supply water to the beverage capsule.

In some embodiments, the beverage making assembly is fixed in the beverage making cavity and has a side opening for putting the beverage capsule into the beverage making cavity.

In some embodiments, the water dispenser having beverage-making function further comprises a sleeve disposed at a bottom of the beverage container for receiving beverage flowing out of the beverage container, and having a beverage outlet formed in a bottom thereof. By providing the sleeve, it is possible to prevent the beverage flowing out of the beverage container from spattering and to shorten a distance between the beverage outlet and a cup of the user for receiving the beverage, which makes the beverage-discharging function safe and reliable.

Advantageously, a bottom wall of the sleeve is inclined towards the beverage outlet, which may prevent the beverage from depositing on the bottom of the sleeve and may make the cleaning of the sleeve easy.

Advantageously, the sleeve is extendable and retractable in an axial direction thereof. Thus, when different sizes of cups are put on a water receiver of the water dispenser to receive the beverage, it is possible to ensure the beverage to flow out smoothly without spattering.

In some embodiments, the beverage making cavity is disposed at one of a front side, a right side and a left side of the body, and a side of the beverage making cavity corresponding to the one side is opened.

In some embodiments, a storing chamber for containing the beverage capsule is formed in the body.

Alternatively, the storing chamber is formed at an upper part or a lateral part of the body.

Alternatively, the storing chamber is extended in a horizontal direction, in a vertical direction or in an inclined direction.

The water dispenser having beverage-making function according to embodiments of the present invention may provide both water and beverage while saving the occupied space, and may be convenient to use, simple in structure and low in cost.

BRIEF DESCRIPTION OF THE DRAWINGS

FIG. 4b is a schematic view showing an installation of the beverage making assembly in FIG. 4a;

FIG. 6b is an enlarged view of portion B in FIG. 6a;

Figure 1:
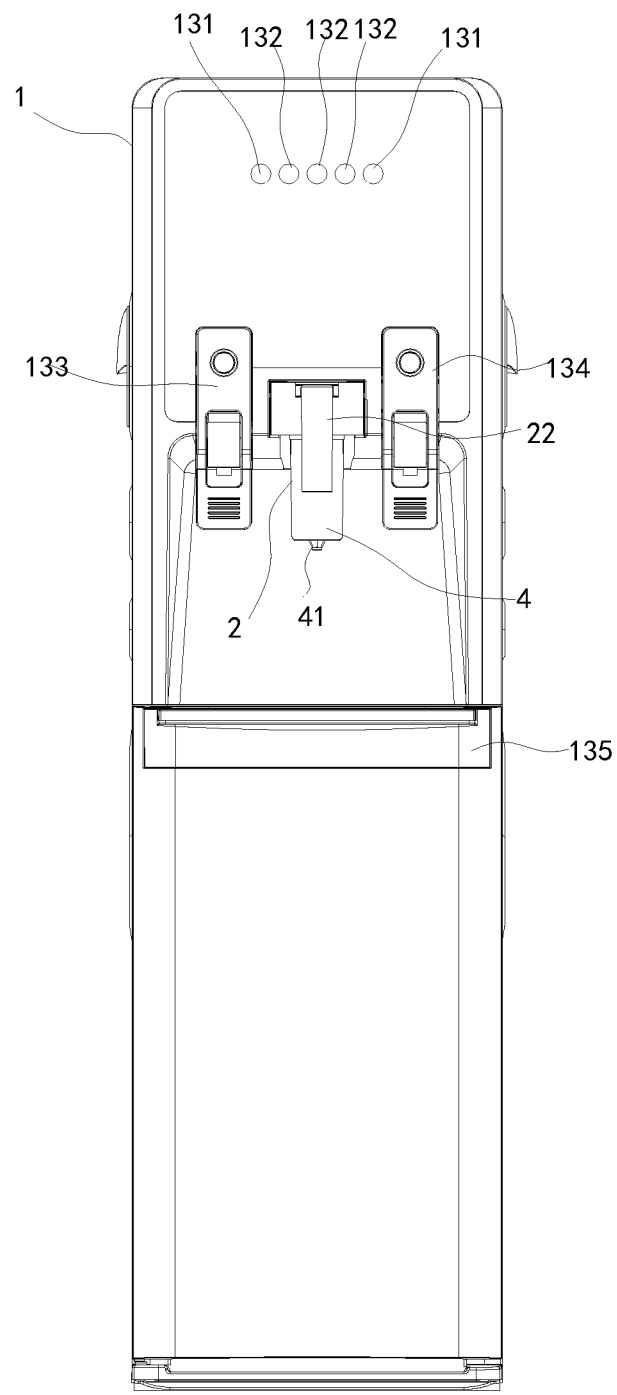
FIG. 1 is a front view of a water dispenser having beverage-making function according to an embodiment of the present invention.

REFERENCE NUMERALS 1 body
110 inner wall
11 beverage making cavity
111 snap hole
112 open side
12 storing chamber
13 front cover
131 indicator light
132 beverage control key
133 hot water tap
134 cold water tap
135 water receiver
14 top cover
15 micro switch
2 beverage making assembly
21 beverage container
211 first penetration member
22 gripping part
220 snap tongue
221 annular supporting member
222 handle
2221 connecting handle portion
22211 through hole
2222 gripping handle portion
2223 supporting handle portion
223 pressing member
2231 button
2232 actuating rod
22321 extension portion
224 first spring
23 baffle plate
3 water injection mechanism
31 driving rod
311 second penetration member
312 rotation shaft
313 guide member
32 second spring
33 sealing member
4 sleeve
41 beverage outlet
9 beverage capsule

DETAILED DESCRIPTION

Embodiments of the present invention will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present invention. The embodiments shall not be construed to limit the present invention.

The water dispenser having beverage-making function according to embodiments of the present invention will be described in detail with reference to the drawings.

The water dispenser according to embodiments of the present invention comprises a body 1, a beverage making assembly 2 and a water injection mechanism 3. A beverage making cavity 11 is formed in the body 1 and has an open side 112. The beverage making assembly 2 is disposed in the beverage making cavity 11 and includes a beverage container 21 for accommodating a beverage capsule 9 such as a coffee capsule, a fruit juice capsule and a powdered juice capsule. The beverage capsule 9 may be put into the beverage container 21 via the open side 112 of the beverage making cavity 11.

The beverage capsule 9 may be known beverage capsule available in the market, and detailed description thereof will be omitted here.

Figure 2:
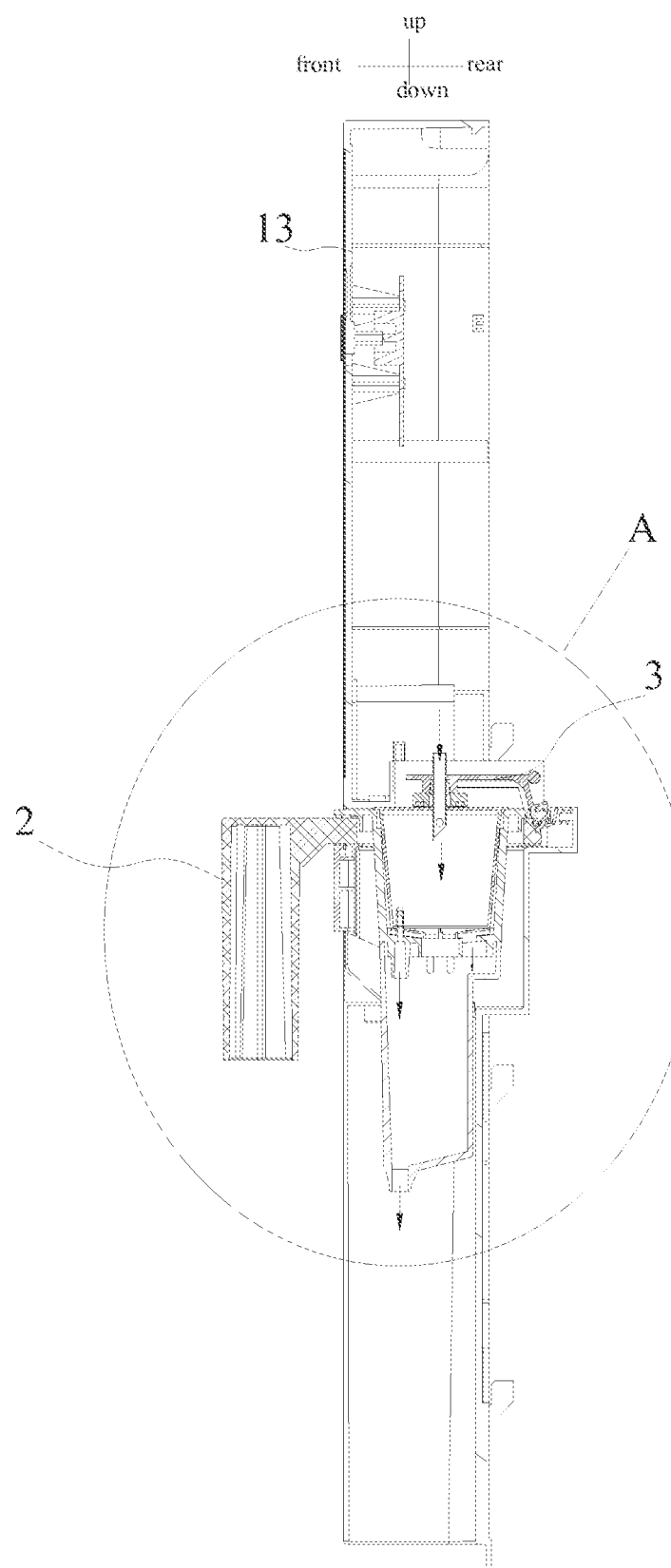
FIG. 2 is a sectional view of a front cover of the water dispenser having beverage-making function in FIG. 1, in which a beverage making assembly and a beverage capsule have already been assembled in the front cover.
Figure 3:
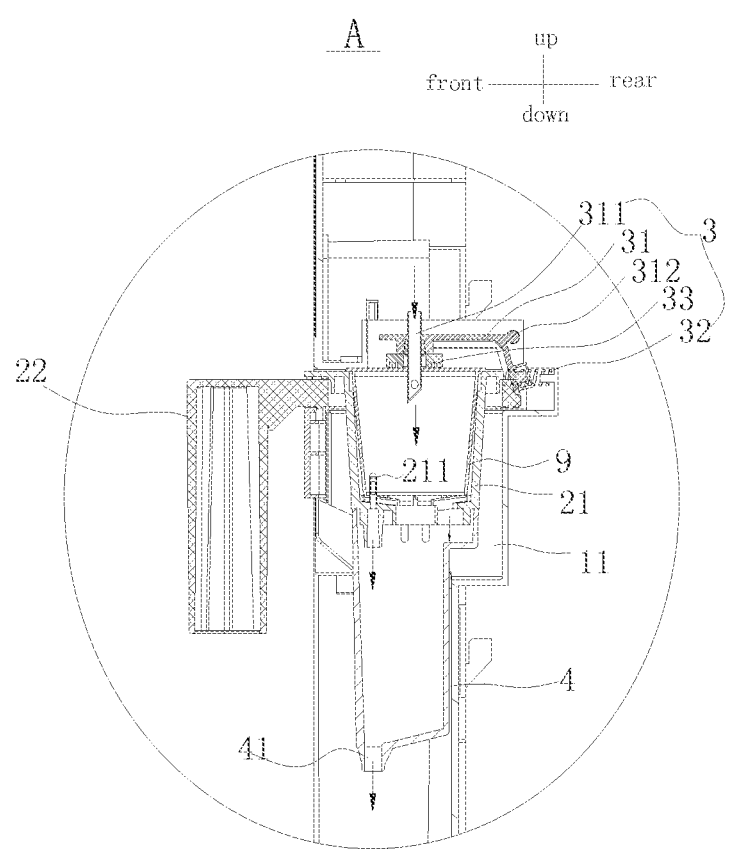
FIG. 3 is an enlarged view of portion A in FIG. 2.

As shown in FIGS. 1-3, in some embodiments, the beverage making cavity 11 is formed at a front side of the body 1 and a front side of the beverage making cavity 11 is opened. Alternatively, the beverage making cavity 11 may also be formed at a left side or a right side of the body 1 and the left side or the right side of the chamber 11 is opened. In the following description, the beverage making cavity 11 formed at the front side of the body 1 is taken as an example for explanation.

As shown in FIG. 1, the body 1 has a front cover 13. A hot water tap 133, a cold water tap 134 and a water receiver 135 are disposed on the front cover 13, and the beverage making cavity 11 may be formed between the hot water tap 133 and the cold water tap 134. The hot water tap 133, the cold water tap 134 and the water receiver 135 may be well known to those skilled in the art and detailed description thereof will be omitted here.

A plurality of indicator lights 131 and a plurality of beverage control keys 132 may be disposed on the front cover 13. For example, the plurality of beverage control keys 132 may be used to control a flow rate of the water supplied to the beverage capsule 9, thereby controlling the amount of the beverage to be made.

The beverage container 21 has a first penetration member 11 for penetrating a bottom of the beverage capsule 9 placed therein. The water injection mechanism 3 is used to supply water to the beverage capsule 9 and has a second penetration member 311 for penetrating a top of the beverage capsule 9.

When the beverage capsule 9 is put into the beverage container 21, the second penetration member 311 penetrates the top of the beverage capsule 9 and supplies water to the beverage capsule 9, then the water is mixed with the beverage powder such as the coffee power in the beverage capsule 9 to make beverage. While the first penetration member 211 penetrates the bottom of the beverage capsule 9, the beverage in the beverage container 21 flows into a cup for drinking.

With the water dispenser according to embodiments of the present invention, by disposing the beverage making assembly including the beverage container into the beverage making cavity defined in the body of the water dispenser, the beverage making assembly is incorporated into the water dispenser. Thus, the water dispenser can provide both water and beverage. Furthermore, the water dispenser occupies a small space and is convenient to use.

Figure 10:
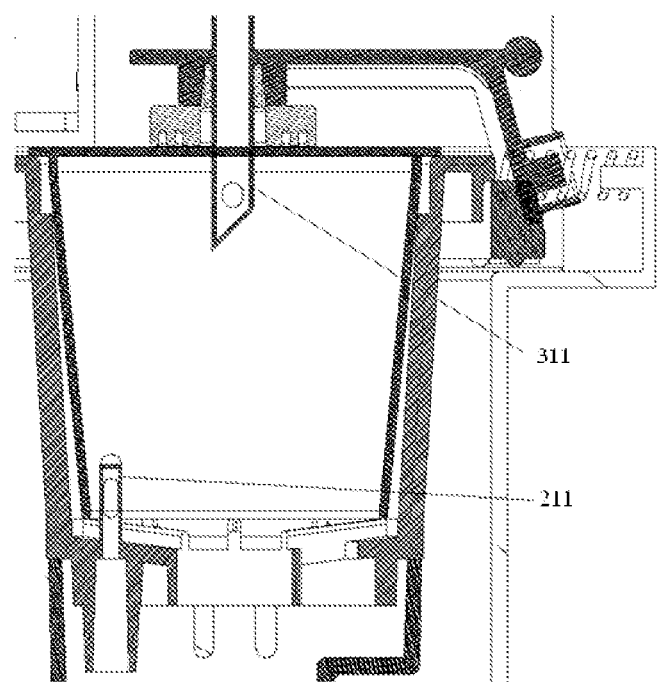
FIG. 10 is a schematic view of a first penetration member and a second penetration member in FIG. 2.

As shown in FIG. 10, the first penetration member 211 is a tubular member being hollow and having a first radial through hole and a sharp upper end, and the second penetration member 311 is a tubular member being hollow and having a second radial through hole and a sharp lower end. Advantageously, each of the first penetration member 211 and the second penetration member 311 is fabricated from a steel pipe.

In some embodiments of the present invention, as shown in FIGS. 1-4b, the beverage making assembly 2 is capable of putting into and taking out of the beverage making cavity 11 via the open side 112. Alternatively, in some other embodiments, the beverage making assembly 2 may also be fixed in the beverage making cavity 11 and has a side opening (not shown) for putting the beverage capsule 9 into the beverage container 21.

Thus, when the beverage capsule 9 is pushed into the beverage making cavity 11, the top of the beverage capsule 9 is penetrated by the second penetration member 311 to supply water, and the bottom of the beverage capsule 9 is penetrated by the first penetration member 211 to make the beverage. In the following description, the beverage making assembly capable of putting into and taking out of the beverage making cavity 11 is taken as an example for explanation.

Specifically, the beverage making assembly further comprises a gripping part 22 for supporting the beverage container 21. The gripping part 22 is connected with an inner wall of the beverage making cavity 11 via a snap structure. In other words, when the beverage making assembly is put into the beverage making cavity 11, the gripping part 22 is connected with the inner wall of the beverage making cavity 11 via the snap structure. When the beverage making assembly is taken out of the beverage making cavity 11, the gripping part 22 is disconnected from the inner wall of the beverage making cavity 11.

Figure 4A:
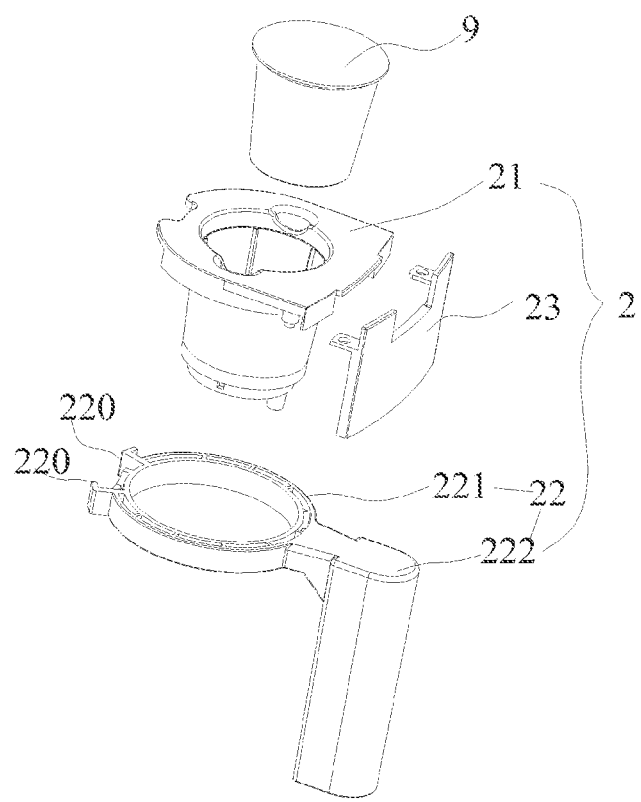
FIG. 4a is an explosion view of the beverage making assembly of the water dispenser having beverage-making function in FIG. 1.
Figure 4B:
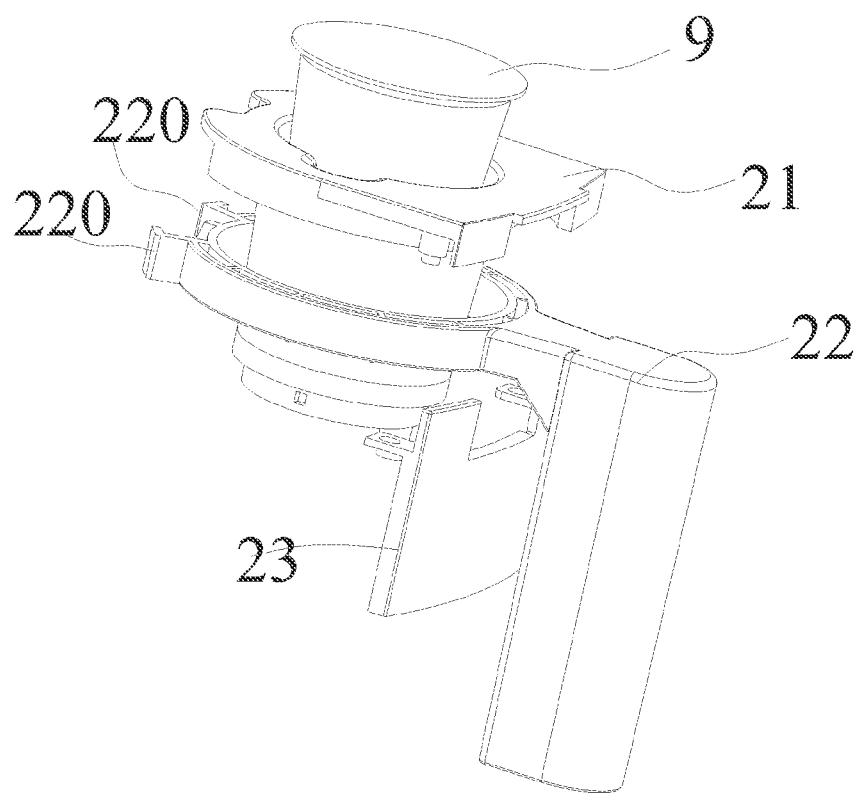
Figure 5:
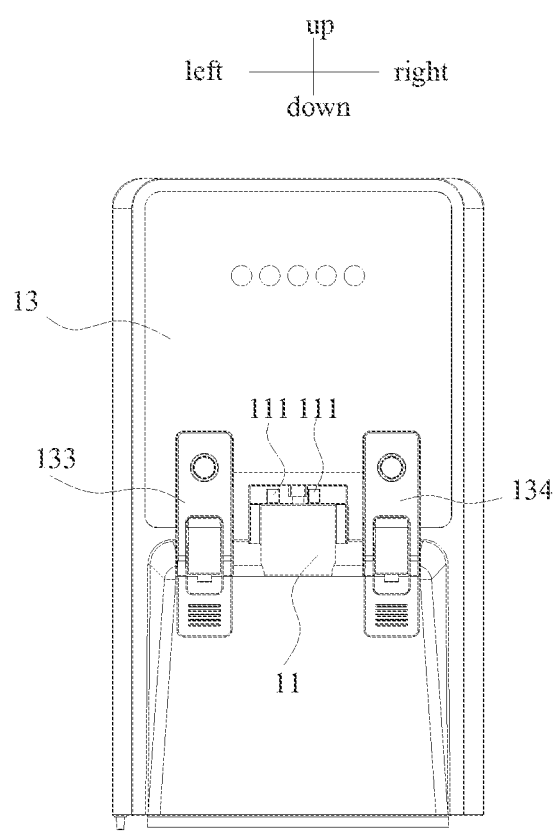
FIG. 5 is a schematic partial view of the front cover of the water dispenser having beverage-making function in FIG. 1.

As shown in FIGS. 4a-5, in one example of the present invention, the snap structure comprises a plurality of snap tongues 220 disposed on the gripping part 22 and bent in the same direction, and a plurality of snap holes 111 formed in the inner wall of the beverage making cavity 11 and corresponding to the snap tongues 220 respectively.

The gripping part 22 and the inner wall of the beverage making cavity 11 are detectably connected by extending the plurality of snap tongues 220 into the plurality of snap holes 111 and then rotating the gripping part 22. As shown in FIGS. 4a-5, there are two snap tongues 220 disposed on a rear side of the gripping part 22 and spaced apart from each other. Correspondingly, there are two snap holes 111 formed in the rear wall of the beverage making cavity 11. Thus, the beverage making assembly 2 is secured in the beverage making cavity 11 by rotating the gripping part 22 in a first direction, and the beverage making assembly 2 can be taken out of the beverage making cavity 11 by rotating the gripping part 22 in a second direction opposite to the first direction. Thus, the beverage making assembly 2 can be mounted steadily and detached conveniently.

Figure 6A:
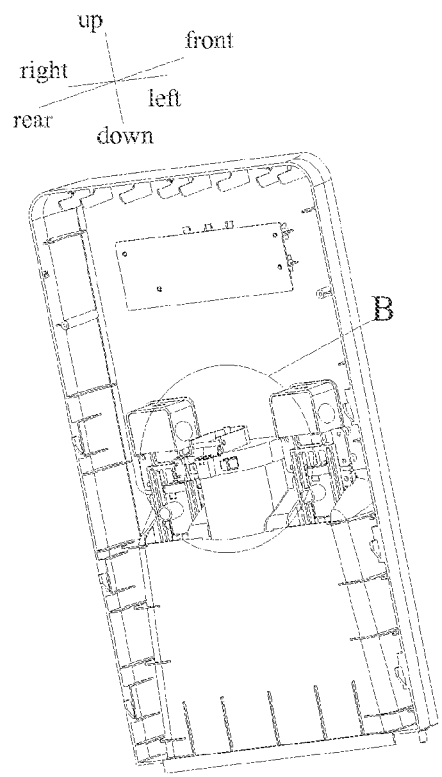
FIG. 6a is a schematic view showing a rear side of the front cover in FIG. 5.
Figure 6B:
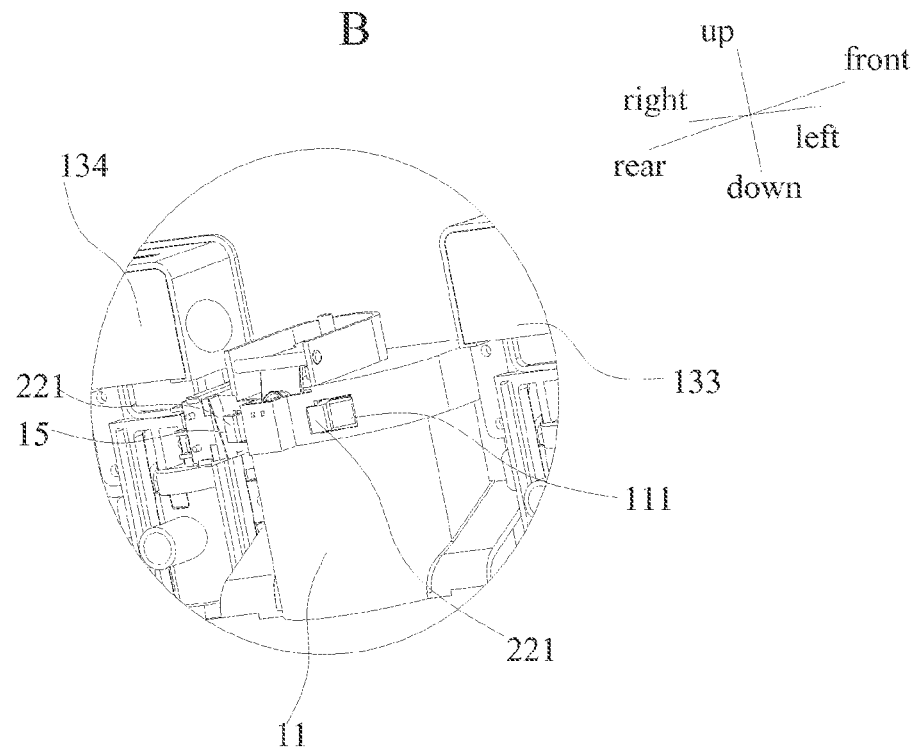

As shown in FIGS. 6a-6b, a micro switch 15 is disposed on an outer wall of the beverage making cavity 11, and the micro switch 15 is actuated by extending the snap tongue 220 into the snap hole 111 and then rotating the gripping part 22 so as to turn on a circuit in the body 10 for making beverage.

In another example, the gripping part 22 has the snap tongue, and a snap slot (not shown) fitted with the snap tongue is formed in the inner wall of the beverage making cavity 11. Thus, the gripping part 22 can also be connected with the inner wall of the beverage making cavity 11 via snap fit.

Figure 11:
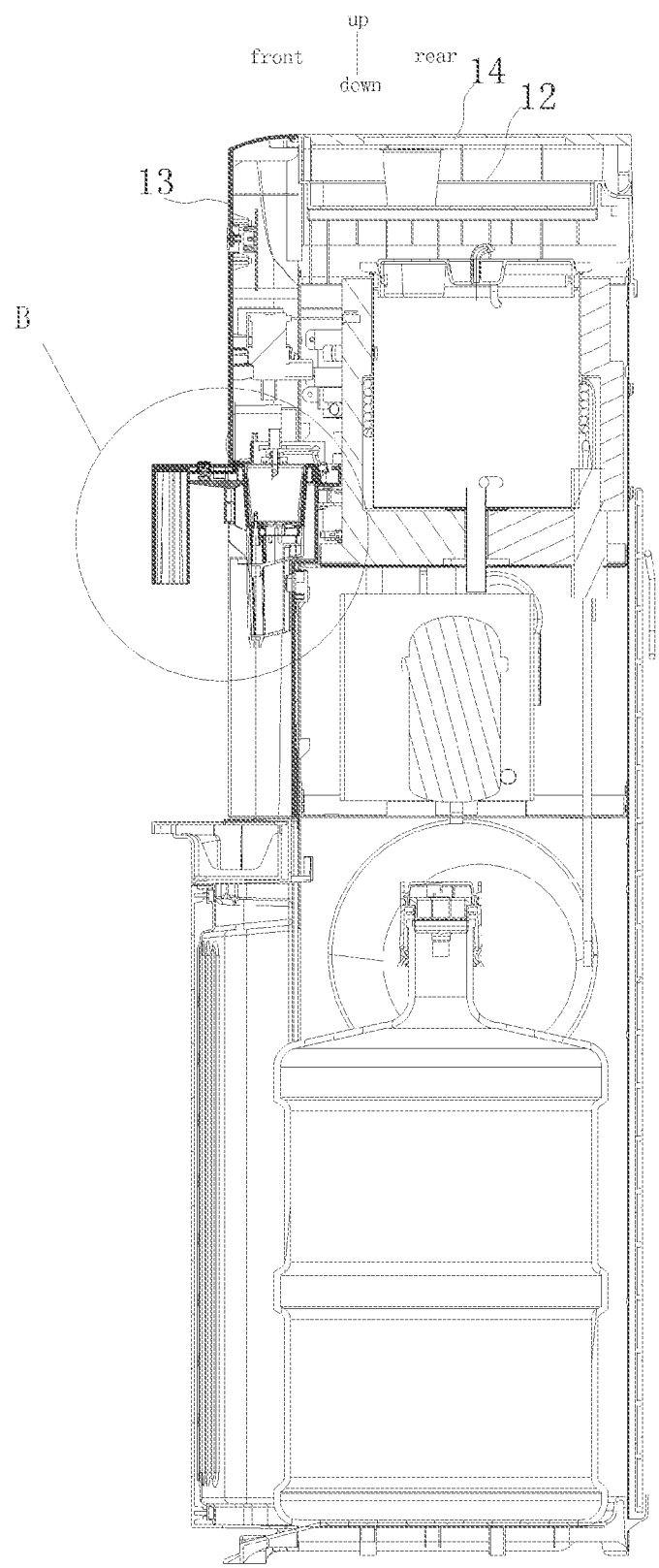
FIG. 11 is a side view of a water dispenser having beverage-making function according to another embodiment of the present disclosure.
Figure 12:
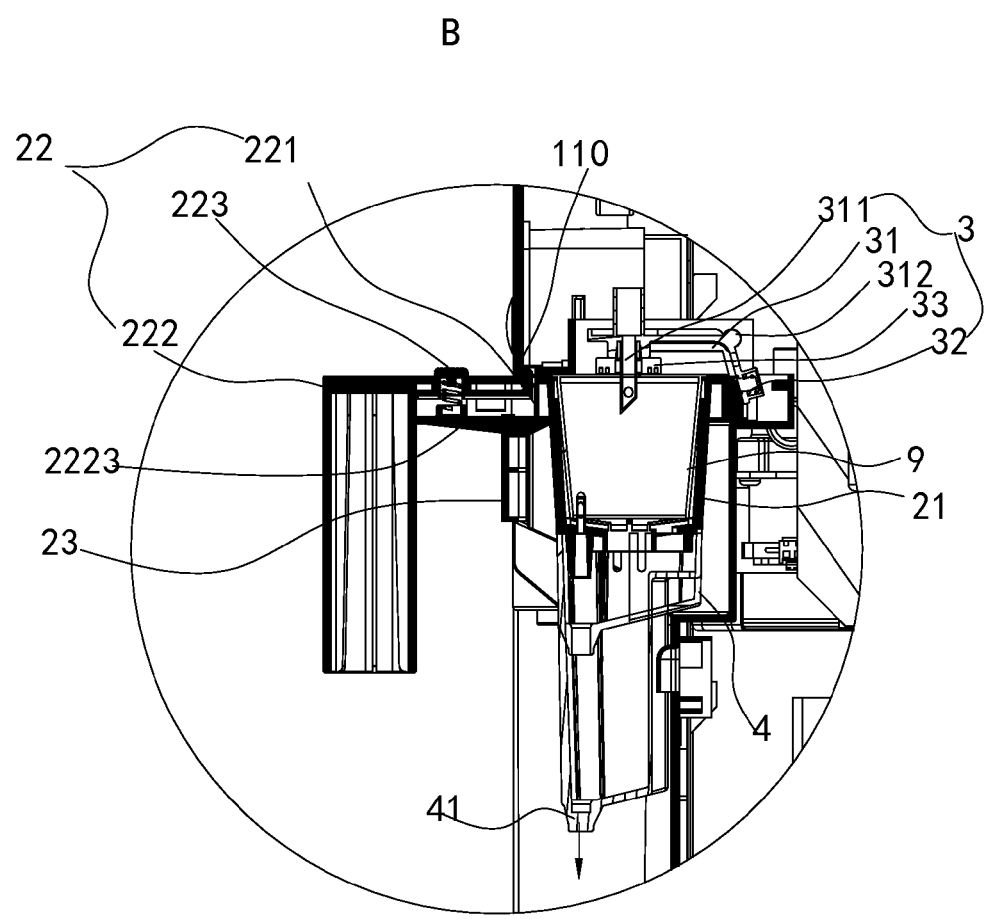
FIG. 12 is an enlarged view of portion B in FIG. 11.
Figure 13:
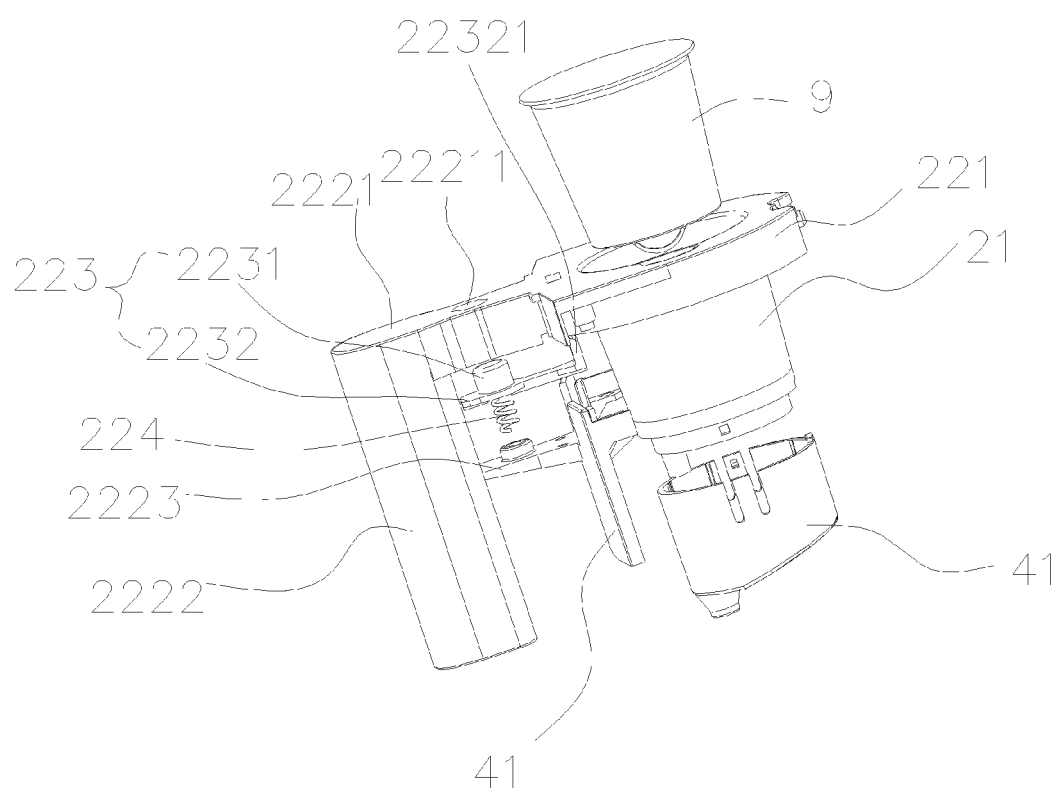
FIG. 13 is an exploded view of the beverage making assembly of the water dispenser having beverage-making function in FIG. 11.

As shown in FIGS. 11-13, in one embodiment of the present disclosure, the gripping part 22 has a movable pressing member 223. A first end of the pressing member 223 is abutted against the inner wall 110 of the beverage making cavity, and the pressing member 223 is configured such that the first end thereof is disengaged from the inner wall 110 of the beverage making cavity when it is actuated.

Specifically, as shown in FIGS. 12 and 13, the handle 222 comprises a connecting handle portion 2221 and a gripping handle portion 2222. For example, the connecting handle portion 2221 is connected with the annular supporting member 221, and has a through hole 22211 penetrating therethrough. The gripping handle portion 2222 is connected with the connecting handle portion 2221. The pressing member 223 comprises a button 2231 and an actuating rod 2232. The button 2231 is movable in the through hole 22211. A first end (for example, the left end shown in FIGS. 12 and 13) of the actuating rod 2232 is connected with the button 2231, and a second end (for example, the right end shown in FIGS. 12 and 13) of the actuating rod 2232 is abutted against the inner wall 110 of the beverage making cavity. Advantageously, as shown in FIG. 13, the second end (for example, the right end shown in FIG. 13) of the actuating rod 2232 has an extension portion 22321 extending upwards. The extension portion 22321 extends upwards through the annular supporting member 221 and is abutted against the inner wall 110 of the beverage making cavity.

Alternatively, as shown in FIGS. 12 and 13, the connecting handle portion 2221 is substantially horizontally disposed, and the gripping handle portion 2222 is disposed substantially perpendicular to the connecting handle portion 2221. The gripping handle portion 2222 is provided with a supporting handle portion 2223 substantially parallel to the connecting handle portion 2221, and the pressing member 223 is disposed on the connecting handle portion 2223 via a first spring 224.

Thus, as shown in FIG. 12, when the user wants to push the beverage making assembly 2 into the beverage making cavity 11 horizontally, the user presses and holds the button 2231 to push the beverage making assembly 2 in place, and then releases the button 2231 to make the extension portion 22321 move upwards and abut against the inner wall 110 of the beverage making cavity. When the user wants to take out the beverage making assembly 2, the user presses the button 2231 to make the actuating rod 2232 move downwards, so that the extension portion 22321 moves downwards to disengage from the inner wall 110 of the beverage making cavity, thus taking out the beverage making assembly 2.

As shown in FIGS. 4a-4b, the gripping part 22 comprises an annular supporting member 221 for supporting the beverage container 21 and a handle 222. The annular supporting member 221 is connected to the inner wall of the beverage making cavity 11, and the handle 222 is connected at a side of the annular supporting member 221 remote from the beverage making cavity 11, i.e. the front side of the annular supporting member 221, such that the use may mount or detach the beverage making assembly 2 conveniently.

For example, as shown in FIG. 4a, the handle 222 is connected at a front side of the annular supporting member 221. Thus, it is convenient for the user to mount or detach the beverage making assembly 2. Alternatively, the beverage making assembly 2 may further comprise a baffle plate 23. As shown in FIG. 1, the baffle plate 23 is disposed between the handle 222 and the beverage container 21 and configured to close the open side 112 after the beverage making assembly 2 is put in the beverage making cavity 11. In other words, a width of the baffle plate 23 matches with a width of the open side 112 of the beverage making cavity 11. Thus, the beverage container 21 is shielded, thus improving the aesthetics of the appearance of the water dispenser. In the above embodiments with the pressing member 223, the supporting handle portion 2223 may be connected between the gripping handle portion 2222 and the baffle plate 23, as shown in FIG. 11.

Figure 9:
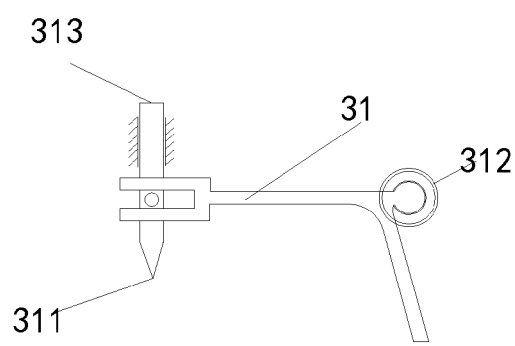
FIG. 9 is a schematic view of a driving rod of the water dispenser having beverage-making function in FIG. 3.

In some embodiments, the water injection mechanism 3 comprises a driving rod 31 and a second spring 32. The driving rod 31 is connected pivotably to a top wall of the beverage making cavity 11 and configured such that two ends thereof are rotatable. In other words, the driving rod 31 is configured as a lever rotatable about a rotation shaft 312. Specifically, as shown in FIG. 3 and FIG. 9, the driving rod 31 is fabricated to have an "L" shape, and the rotation shaft 312 is disposed at a corner of the driving rod 31.

The second penetration member 311 is disposed vertically on a first end of the driving rod 31 (i.e., the front end in FIG. 3) and driven to move in an up and down direction by a guide member 313 disposed in the body 1. When the beverage making assembly 2 is put into the beverage making cavity 11, the gripping part 22 drives a second end (i.e., the rear end in FIG. 3) of the driving rod 31 to rotate so as to drive the second penetration member 311 to penetrate the top of the beverage capsule 9. The second spring 32 is disposed between the second end of the driving rod 31 and the inner wall of the beverage making cavity 11 so as to normally push the driving rod 31 in a direction of driving the second end of the driving rod 31 upwardly or to return the driving rod 31 to its initial position.

Thus, when the user pushes the beverage making assembly 2 into the beverage making cavity 11 horizontally, a rear end of the gripping part 22 actuates the second end of the driving rod 31 to move backwards, so that the first end of the driving rod 31 moves downwards against the force of the second spring 32, to drive the second penetration member 311 to penetrate the top of the beverage capsule 9. When the beverage making assembly 2 is taken out of the beverage making cavity 11, the driving rod 31 returns to an original position under the action of the second spring 32.

Advantageously, the water injection mechanism 3 further comprises a sealing member 33 located below the first end of the driving rod 31, fitted over the second penetration member 311 and compressed onto the top of the beverage capsule 9. Thus, it is ensured that the second penetration member 311 penetrates the top of the beverage capsule 9 easily and it is convenient to supply the water to the beverage capsule 9.

Alternatively, the sealing member 33 is a rubber sealing ring. Further, the water injection mechanism 3 may comprise a water pipe (not shown) communicated with the second penetration member 311 to supply the water to the beverage capsule 9. For example, the water pipe may be communicated with a hot water outlet inside the water dispenser. In some embodiments, the second penetration member 311 may be integrally formed with the driving rod 31.

As shown in FIGS. 1-4b, the water dispenser having beverage-making function may further comprise a sleeve 4. The sleeve 4 is disposed at a bottom of the beverage container 21 for receiving beverage flowing out of the beverage container 21, and a beverage outlet 41 is formed in a bottom of the sleeve 4. By providing the sleeve 4, the beverage flowing out of the beverage container 21 may be prevented from spattering, and a distance between the beverage outlet 41 and the cup for receiving the beverage may be shortened, thus making the beverage-discharging function safe and reliable.

Alternatively, a bottom wall of the sleeve 4 is inclined towards the beverage outlet 41, which may prevent the beverage from depositing on the bottom wall of the sleeve 4 and may make the cleaning of the sleeve 4 easy. Advantageously, the sleeve 4 is extendable and retractable in an axial direction thereof. Thus, when different sizes of cups are put on the water receiver 135 to receive the beverage, it may be ensured that the beverage flows out smoothly without spattering. A plurality of sleeves 4 having different lengths may be provided, thus preventing the beverage from spattering when different sizes of cups are used to receive the beverage.

Figure 7:
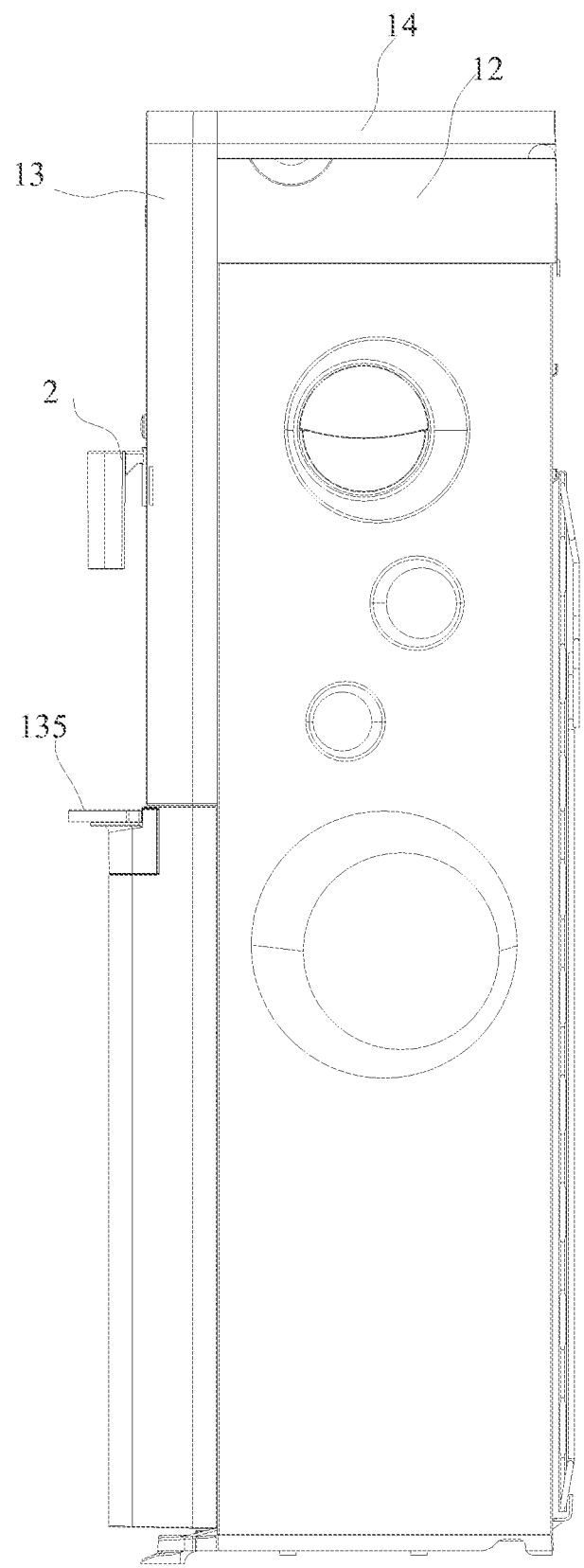
FIG. 7 is a side view of the water dispenser having beverage-making function in FIG. 1.
Figure 8:
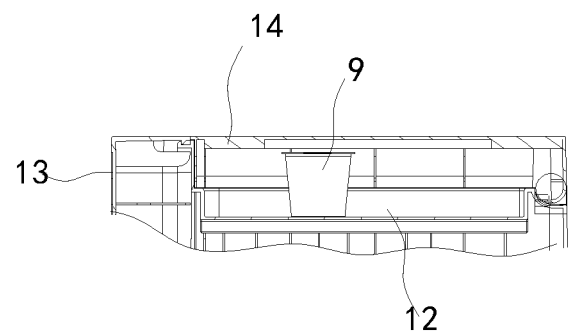
FIG. 8 is a schematic sectional view of an upper portion of the water dispenser having beverage-making function in FIG. 7.

In some embodiments, a storing chamber 12 for containing and storing the beverage capsule 9 is formed in the body 1. The storing chamber 12 may be formed at an upper part or a side part of the body 1, as shown in FIG. 7 and FIG. 8.

Alternatively, the storing chamber 12 may be extended in a horizontal direction, in a vertical direction or in an inclined direction. The beverage capsules 9 may be arranged side by side in the storing chamber 12, such that it is convenient for the user to take the beverage capsules 9 out of the storing chamber 12 or to put the beverage capsules 9 into the storing chamber 12.

The beverage-making process of the water dispenser having beverage-making function will be described in detail with reference to FIGS. 1-8.

Firstly, the user takes one beverage capsule 9 out of the storing chamber 12. Certainly, the user may take one beverage capsule 9 from somewhere else.

The user holds the handle 222 and rotates the gripping part 22 to disconnect the beverage making assembly 2 from the wall of the beverage making cavity 11, then takes the beverage making assembly 2 out of the beverage making cavity 11 horizontally.

Next, the user puts the beverage capsule 9 into the beverage container 21, and the first penetration member 211 penetrates the bottom of the beverage capsule 9.

Then, the beverage making assembly 2 containing the beverage capsule 9 is pushed into the beverage making cavity 11 horizontally, then the gripping part 2 actuates the second end of the driving rod 3 to move backwards, and thereby the first end of the driving rod 31 moves downwards to drive the second penetration member 311 to penetrate the top of the beverage capsule 9.

At the same time, the two snap tongues 220 at the rear side of the gripping part 22 are extended into two corresponding snap holes 111. Then, the user rotates the gripping part 22 to secure the beverage making assembly 2 into the beverage making cavity 11, and the micro switch 15 is actuated by the snap tongues 220 so as to turn on a circuit in the body 1 for making beverage.

The user presses the beverage control key 133 to supply the water to the beverage capsule 9 via the water pipe and the hollow second penetration member 311, then the water is mixed with the beverage powder in the beverage capsule 9 to make beverage. Finally, the beverage flows through the first penetration member 211 and the sleeve 4 and flows into the cup via the beverage outlet 41.

The water dispenser having beverage-making function according to embodiments of the present invention may provide both water and beverage while saving occupied space, and may be convenient to use, simple in structure and low in cost.

Other structures such as the hot water tap and the cold water tap of the water dispenser having beverage-making function according to embodiments of the present invention, and operations thereof are well known to those skilled in the art, and will not described in detail herein.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. These relative terms shall not be construed to limit the present invention. In addition, terms such as "first" and "second" are used herein for purposes of description and are not intended to indicate or imply relative importance or significance. Thus, the feature defined with "first" and "second" may comprise one or more this feature. In the description of the present invention, "a plurality of" means two or more than two, unless specified otherwise.

Terms concerning attachments, coupling and the like, such as "mounted," "connected" and "coupled" are used broadly and refer to a relationship in which structures are secured or attached to one another either directly or indirectly through intervening structures, as well as both movable or rigid attachments or relationships, unless expressly described otherwise. Further, "connected" and "coupled" are not restricted to physical or mechanical connections or couplings.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the invention. Thus, the appearances of the phrases such as "in some embodiments", "in one embodiment", "in an embodiment", "an example", "a specific examples", or "some examples" in various places throughout this specification are not necessarily referring to the same embodiment or example of the invention. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the invention. Such changes, alternatives, and modifications all fall into the scope of the claims and their equivalents.

What is claimed is:

1. A water dispenser having beverage-making function, comprising:
    a body defining a beverage making cavity with an open side therein;
    a beverage making assembly disposed in the beverage making cavity and including a beverage container for accommodating a beverage capsule, the beverage container having a first penetration member for penetrating a bottom of the beverage capsule;

a water injection mechanism for supplying water to the beverage capsule and having a second penetration member for penetrating a top of the beverage capsule; and a sleeve disposed at a bottom of the beverage container for receiving beverage flowing out of the beverage container, and having a beverage outlet formed in a bottom thereof.

2. A water dispenser having beverage-making function, comprising:
   a body defining a beverage making cavity with an open side therein;
   a beverage making assembly disposed in the beverage making cavity and including a beverage container for accommodating a beverage capsule, the beverage container having a first penetration member for penetrating a bottom of the beverage capsule; and
   a water injection mechanism for supplying water to the beverage capsule and having a second penetration member for penetrating a top of the beverage capsule;
   wherein a storing chamber for containing the beverage capsule is formed in the body.

3. A water dispenser having beverage-making function, comprising:
   a body defining a beverage making cavity with an open side therein;
   a beverage making assembly disposed in the beverage making cavity and including a beverage container for accommodating a beverage capsule, the beverage container having a first penetration member for penetrating a bottom of the beverage capsule; and
   a water injection mechanism for supplying water to the beverage capsule and having a second penetration member for penetrating a top of the beverage capsule;
   wherein the beverage making assembly further comprises:
      a gripping part for supporting the beverage container adapted to connect with an inner wall of the beverage making cavity via a snap structure;
   wherein the gripping part comprises:
      an annular supporting member for supporting the beverage container connected to the inner wall of the beverage making cavity; and
      a handle connected with a side of the annular supporting member remote from the beverage making cavity.

4. The water dispenser having beverage-making function according to claim 3, wherein the first penetration member is a tubular member being hollow and having a first radial through hole and a sharp upper end; and
   wherein the second penetration member is a tubular member being hollow and having a second radial through hole and a sharp lower end.

5. The water dispenser having beverage-making function according to claim 4, wherein the beverage making assembly is detachably disposed in the beverage making cavity.

6. The water dispenser having beverage-making function according to claim 5, wherein the snap structure comprises a plurality of snap tongues disposed on the gripping part and bent in the same direction, and a plurality of snap holes formed in the inner wall of the beverage making cavity and corresponding to the snap tongues respectively, and the gripping part and the inner wall of the beverage making cavity are detectably connected by extending the plurality of snap tongues into the plurality of snap holes and then rotating the gripping part.

7. The water dispenser having beverage-making function according to claim 6, wherein a micro switch is disposed on an outer wall of the beverage making cavity, and the micro switch is actuated by extending the snap tongue into the snap hole and then rotating the gripping part so as to turn on a circuit in the body for making beverage.

8. The water dispenser having beverage-making function according to claim 5, wherein the gripping part has a movable pressing member, a first end of the pressing member is abutted against the inner wall of the beverage making cavity, and the pressing member is configured such that the first end thereof is disengaged from the inner wall of the beverage making cavity when actuated.

9. The water dispenser having beverage-making function according to claim 8, wherein the handle comprises:
   a connecting handle portion connected with the annular supporting member and having a through hole penetrating therethrough; and
   a gripping handle portion connected with the connecting handle portion, and
   wherein the pressing member comprises a button and an actuating rod, the button is movable in the through hole, a first end of the actuating rod is connected with the button, and a second end of the actuating rod is abutted against the inner wall of the beverage making cavity.

10. The water dispenser having beverage-making function according to claim 9, wherein the connecting handle portion is substantially horizontally disposed, the gripping handle portion is provided with a supporting handle portion substantially parallel to the connecting handle portion, and the pressing member is disposed on the supporting handle portion via a first spring.

11. The water dispenser having beverage-making function according to claim 5, wherein the beverage making assembly further comprises:
   a baffle plate disposed between the handle and the beverage container and configured to close the open side after the beverage making assembly is assembled in the beverage making cavity.

12. The water dispenser having beverage-making function according to claim 5, wherein the water injection mechanism further comprises:
   a driving rod connected pivotably to a top of the beverage making cavity and configured such that two ends thereof are rotatable, in which the second penetration member is disposed vertically on a first end of the driving rod, and when the beverage making assembly is put into the beverage making cavity, the gripping part drives a second end of the driving rod to rotate so as to drive the second penetration member to penetrate the top of the beverage capsule; and
   a second spring disposed between the second end of the driving rod and the inner wall of the beverage making cavity.

13. The water dispenser having beverage-making function according to claim 12, wherein the water injection mechanism further comprises a sealing member located below the first end of the driving rod, fitted over the second penetration member and compressed onto the top of the beverage capsule.

14. The water dispenser having beverage-making function according to claim 13, wherein the water injection mechanism further comprises a water pipe communicated with the second penetration member to supply water to the beverage capsule.

15. The water dispenser having beverage-making function according to claim 3, wherein the beverage making assembly is fixed in the beverage making cavity and has a side opening for putting the beverage capsule into the beverage making cavity.

16. The water dispenser having beverage-making function according to claim 3, further comprising:
   a sleeve disposed at a bottom of the beverage container for receiving beverage flowing out of the beverage container, and having a beverage outlet formed in a bottom thereof.

17. The water dispenser having beverage-making function according to claim 16, wherein a bottom wall of the sleeve is inclined towards the beverage outlet.

18. The water dispenser having beverage-making function according to claim 16, wherein the sleeve is extendable and retractable in an axial direction thereof.

19. The water dispenser having beverage-making function according to claim 3, wherein the beverage making cavity is disposed at one of a front side, a right side and a left side of the body, and a side of the beverage making cavity corresponding to the one side is opened.

20. The water dispenser having beverage-making function according to claim 3, wherein a storing chamber for containing the beverage capsule is formed in the body.

21. The water dispenser having beverage-making function according to claim 20, wherein the storing chamber is formed at an upper part or a lateral part of the body.

22. The water dispenser having beverage-making function according to claim 21, wherein the storing chamber is extended in a horizontal direction, in a vertical direction or in an inclined direction.

\* \* \* \* \*